United States Patent
Jiang et al.

(10) Patent No.: US 10,966,250 B2
(45) Date of Patent: Mar. 30, 2021

(54) METHOD FOR INDICATING AND DETERMINING LISTEN-BEFORE-TALK PARAMETERS, BASE STATION AND USER EQUIPMENT

(71) Applicant: NTT DOCOMO INC., Tokyo (JP)

(72) Inventors: Yu Jiang, Beijing (CN); Liu Liu, Beijing (CN); Jing Wang, Beijing (CN); Huiling Jiang, Beijing (CN); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,487

(22) PCT Filed: Aug. 9, 2017

(86) PCT No.: PCT/CN2017/096544
§ 371 (c)(1),
(2) Date: Feb. 8, 2019

(87) PCT Pub. No.: WO2018/028588
PCT Pub. Date: Feb. 15, 2018

(65) Prior Publication Data
US 2019/0174548 A1    Jun. 6, 2019

(30) Foreign Application Priority Data

Aug. 11, 2016 (CN) .......................... 201610659375.8

(51) Int. Cl.
*H04W 74/08* (2009.01)
*H04W 52/02* (2009.01)
(Continued)

(52) U.S. Cl.
CPC ....... *H04W 74/0816* (2013.01); *H04W 52/02* (2013.01); *H04W 72/042* (2013.01);
(Continued)

(58) Field of Classification Search
CPC ............ H04W 74/0816; H04W 52/02; H04W 72/042; H04W 72/0446; H04W 72/10; H04W 72/12; H04W 74/006; Y02D 70/00
See application file for complete search history.

(56) References Cited

U.S. PATENT DOCUMENTS

2019/0140727 A1* 5/2019 Kim .................... H04W 48/16

FOREIGN PATENT DOCUMENTS

| CN | 101335550 A | 12/2008 |
| CN | 102404854 A | 4/2012 |

(Continued)

OTHER PUBLICATIONS

International Search Report regarding PCT/CN2017/096544, dated Nov. 2, 2017.
(Continued)

*Primary Examiner* — Eric Myers
(74) *Attorney, Agent, or Firm* — Osha Bergman Watanabe & Burton LLP

(57) ABSTRACT

Provided are a method used for indicating and determining a parameter value of Listen-Before-Talk (LBT) parameters, a base station and a user equipment, the method including: determining a parameter value of LBT parameters, the LBT parameters including an LBT type, an LBT priority, and a start position of a physical uplink shared channel PUSCH; determining an index for carrying out joint indication of the LBT parameters on the basis of a subset of a full set which is formed by combining possible parameter values of each LBT parameter; generating downlink control information including the index; and sending the downlink control information to a user equipment.

10 Claims, 17 Drawing Sheets

(51) Int. Cl.
*H04W 72/12* (2009.01)
*H04W 72/04* (2009.01)
*H04W 72/10* (2009.01)
*H04W 74/00* (2009.01)

(52) U.S. Cl.
CPC ....... *H04W 72/0446* (2013.01); *H04W 72/10* (2013.01); *H04W 72/12* (2013.01); *H04W 74/006* (2013.01); *Y02D 30/70* (2020.08)

(56) References Cited

FOREIGN PATENT DOCUMENTS

CN 103945505 A 7/2014
WO WO-2016071741 A1 5/2016

OTHER PUBLICATIONS

International Preliminary Report on Patentability regarding PCT/CN2017/096544, including the English translation of the Written Opinion, dated Feb. 12, 2019.
Huawei, HiSilicon, "PHY signaling design for eLAA", R1-164829, Nanjing, China, May 23-37, 2016.
LG Electronics, "LBT schemes in LAA UL", R1-160630, St. Julian's, Malta, Feb. 15-19, 2016.
Huawei, HiSilicon, "UL category 4 LBT with eNB assistance", R1-164072, Nanjing, China, May 23-27, 2016.
Huawei, HiSilicon, "Multi-subframe scheduling design for eLAA", R1-164075, Nanjing, China, May 23-27, 2016.
Extended European Search Report from counterpart EP178387189, dated Feb. 20, 2020.

* cited by examiner

| Index | LBT type | LBT priority | PUSCH start position (the first scheduled subframe) |
|---|---|---|---|
| 0 | Second type LBT | - | The timing at which a predetermined value elapses after the 0th symbol |
| 1 | | - | The timing at which the predetermined value and a TA value elapse after the 0th symbol |
| 2 | | - | 0th symbol |
| 3 | | - | 1st symbol |
| 4 | Fourth type LBT | 1 | 0th symbol |
| 5 | | 2 | |
| 6 | | 3 | |
| 7 | | 4 | |
| 8 | | 1 | 1st symbol |
| 9 | | 2 | |
| 10 | | 3 | |
| 11 | | 4 | |
| 12-15 | Reserved | | |

FIG. 3

| Index | LBT type | LBT priority | CWS | PUSCH start position (the first scheduled subframe) |
|---|---|---|---|---|
| 0 | Second type LBT | - | - | The timing at which a predetermined value elapses after the 0th symbol |
| 1 | | - | - | The timing at which the predetermined value and a TA value elapse after the 0th symbol |
| 2 | | - | - | 0th symbol |
| 3 | | - | - | 1st symbol |
| 4-5 | | 1 | {3,7} for code points 4 and 5 | 1st symbol |
| 6-7 | | 2 | {7,15} | |
| 8-14 | | 3 | {15,31,63,127,255,511,1023} | |
| 15-21 | Fourth type LBT | 4 | {15,31,63,127,255,511,1023} | |
| 22-23 | | 1 | {3,7} | 0th symbol |
| 24-25 | | 2 | {7,15} | |
| 26-32 | | 3 | {15,31,63,127,255,511,1023} | |
| 33-39 | | 4 | {15,31,63,127,255,511,1023} | |
| 40-63 | Reserved | | | |

FIG. 4

| Index | LBT type | LBT priority | PUSCH start position (the first scheduled subframe) | Remaining subframes in the case where the predetermined value elapses after the 0th symbol |
|---|---|---|---|---|
| 0-7 | Second type LBT | - | The timing at which a predetermined value elapses after the 0th symbol | None, {2}, {3}, {4}, {2,4}, {2,3}, {3,4}, {2,3,4} |
| 8-15 | | - | The timing at which the predetermined value and a TA value elapse after the 0th symbol | None, {2}, {3}, {4}, {2,4}, {2,3}, {3,4}, {2,3,4} |
| 16-23 | | - | 0th symbol | None, {2}, {3}, {4}, {2,4}, {2,3}, {3,4}, {2,3,4} |
| 24-31 | | - | 1st symbol | None, {2}, {3}, {4}, {2,4}, {2,3}, {3,4}, {2,3,4} |
| 32-39 | | 1 | 0th symbol | None, {2}, {3}, {4}, {2,4}, {2,3}, {3,4}, {2,3,4} |
| 40-47 | | 2 | | None, {2}, {3}, {4}, {2,4}, {2,3}, {3,4}, {2,3,4} |
| 48-55 | | 3 | | None, {2}, {3}, {4}, {2,4}, {2,3}, {3,4}, {2,3,4} |
| 56-63 | Fourth type LBT | 4 | | None, {2}, {3}, {4}, {2,4}, {2,3}, {3,4}, {2,3,4} |
| 64-71 | | 1 | 1st symbol | None, {2}, {3}, {4}, {2,4}, {2,3}, {3,4}, {2,3,4} |
| 72-79 | | 2 | | None, {2}, {3}, {4}, {2,4}, {2,3}, {3,4}, {2,3,4} |
| 80-87 | | 3 | | None, {2}, {3}, {4}, {2,4}, {2,3}, {3,4}, {2,3,4} |
| 88-95 | | 4 | | None, {2}, {3}, {4}, {2,4}, {2,3}, {3,4}, {2,3,4} |
| 96-127 | Reserved | | | |

FIG. 5

| Index | LBT type | LBT priority | PUSCH start position (the first scheduled subframe) | Remaining subframes in the case where the predetermined value elapses after the 0th symbol |
|---|---|---|---|---|
| 0-7 | Second type LBT | - | The timing at which a predetermined value elapses after the 0th symbol | None,{2,3},{3,4},{2,4},{2,3},{3,4},{2,3,4} |
| 8-15 | | - | The timing at which the predetermined value and a TA value elapse after the 0th symbol | None,{2,3},{4},{2,4},{2,3},{3,4},{2,3,4} |
| 16-23 | | - | 0th symbol | None,{2},{3},{4},{2,4},{2,3},{3,4},{2,3,4} |
| 24-31 | | - | 1st symbol | None,{2},{3},{4},{2,4},{2,3},{3,4},{2,3,4} |
| 32 | Fourth type LBT | 1 | 0th symbol | None |
| 33 | | 2 | | |
| 34 | | 3 | | |
| 35 | | 4 | | |
| 36 | | 1 | 1st symbol | None |
| 37 | | 2 | | |
| 38 | | 3 | | |
| 39 | | 4 | | |
| 40-63 | Reserved | | | |

FIG. 6

| Index | LBT type | LBT priority | CWS | PUSCH start position (the first scheduled subframe) |
|---|---|---|---|---|
| 0 | Second type LBT | - | - | The timing at which a predetermined value elapses after the 0th symbol |
| 1 |  | - | - | The timing at which the predetermined value and a TA value elapse after the 0th symbol |
| 2 |  | - | - | 0th symbol |
| 3 |  | - | - | 1st symbol |
| 4-5 | Fourth type LBT | 1 | {3,7} for code points 4 and 5 | 1st symbol |
| 6-7 |  | 2 | {7,15} |  |
| 8-14 |  | 3 | {15,31,63,127,255,511,1023} |  |
| 15-16 |  | 1 | {3,7} | 0th symbol |
| 17-18 |  | 2 | {7,15} |  |
| 18-25 |  | 3 | {15,31,63,127,255,511,1023} |  |
| 26-31 | Reserved | | | |

FIG. 7

| Index | LBT type | LBT priority | PUSCH start position (the first scheduled subframe) | Remaining subframes in the case where the predetermined value elapses after the 0th symbol |
|---|---|---|---|---|
| 0-7 | Second type LBT | - | The timing at which a predetermined value elapses after the 0th symbol | None,{2},{3},{4},{2,4},{2,3},{3,4},{2,3,4} |
| 8-15 | | - | The timing at which the predetermined value and a TA value elapse after the 0th symbol | None,{2},{3},{4},{2,4},{2,3},{3,4},{2,3,4} |
| 16-23 | | - | 0th symbol | None,{2},{3},{4},{2,4},{2,3},{3,4},{2,3,4} |
| | | | 1st symbol | None,{2},{3},{4},{2,4},{2,3},{3,4},{2,3,4} |
| 24 | Fourth type LBT | 1 | 0th symbol | None |
| 25 | | 2 | | |
| 26 | | 3 | | |
| 27 | | 4 | | |
| 28 | | 1 | 1st symbol | None |
| 29 | | 2 | | |
| 30 | | 3 | | |
| 31 | | 4 | | |

FIG.8

First example (lossless mode, 4 bits)

| Index | LBT type | LBT priority | PUSCH start position (the first scheduled subframe) |
|---|---|---|---|
| 0 | Second type LBT | - | The timing at which a predetermined value elapses after the 0th symbol |
| 1 | Second type LBT | - | The timing at which the predetermined value and a TA value elapse after the 0th symbol |
| 2 | | - | 0th symbol |
| 3 | | - | 1st symbol |
| 4 | Fourth type LBT | 1 | 0th symbol |
| 5 | Fourth type LBT | 2 | 0th symbol |
| 6 | Fourth type LBT | 3 | 0th symbol |
| 7 | Fourth type LBT | 4 | 0th symbol |
| 8 | | 1 | 1st symbol |
| 9 | | 2 | 1st symbol |
| 10 | | 3 | 1st symbol |
| 11 | | 4 | 1st symbol |
| 12-15 | Reserved | | |

FIG.9

| Index | LBT type | LBT priority | PUSCH start position (the first scheduled subframe) |
|---|---|---|---|
| 0 | Second type LBT | - | The timing at which a predetermined value elapses after the 0th symbol |
| 1 | | - | The timing at which the predetermined value and a TA value elapse after the 0th symbol |
| 2 | | - | 0th symbol |
| 3 | Fourth type LBT | 1 | |
| 4 | | 2 | 0th symbol |
| 5 | | 4 | |
| 6 | | 1 | |
| 7 | | 2 | 1st symbol |
| 8 | | 4 | |

Second example (lossless mode and lossy mode, 4 bits)

FIG.10

Third example (lossless mode, 6 bits)

| Index | LBT type | LBT priority | CWS | PUSCH start position (the first scheduled subframe) |
|---|---|---|---|---|
| 0 | Second type LBT | - | - | The timing at which a predetermined value elapses after the 0th symbol |
| 1 | Second type LBT | - | - | The timing at which the predetermined value and a TA value elapse after the 0th symbol |
| 2 | Second type LBT | - | - | 0th symbol |
| 3 | Second type LBT | - | - | 1st symbol |
| 4-5 | Fourth type LBT | 1 | {3,7} for code points 4 and 5 | 1st symbol |
| 6-7 | Fourth type LBT | 2 | {7,15} | 1st symbol |
| 8-14 | Fourth type LBT | 3 | {15,31,63,127,255,511,1023} | 1st symbol |
| 15-21 | Fourth type LBT | 4 | {15,31,63,127,255,511,1023} | 1st symbol |
| 22-23 | Fourth type LBT | 1 | {3,7} | 0th symbol |
| 24-25 | Fourth type LBT | 2 | {7,15} | 0th symbol |
| 26-32 | Fourth type LBT | 3 | {15,31,63,127,255,511,1023} | 0th symbol |
| 33-39 | Fourth type LBT | 4 | {15,31,63,127,255,511,1023} | 0th symbol |
| 40-63 | Reserved | | | |

FIG.11

Fourth example (lossless mode and lossy mode, 5 bits)

| Index | LBT type | LBT priority | CWS | PUSCH start position (the first scheduled subframe) |
|---|---|---|---|---|
| 0 | Second type LBT | - | - | The timing at which a predetermined value elapses after the 0th symbol |
| 1 | | - | - | The timing at which the predetermined value and a TA value elapse after the 0th symbol |
| 2 | | - | - | 0th symbol |
| 3-13 | Fourth type LBT | 1 | {3,7} | |
| | | 2 | {7,15} | 1st symbol |
| | | 4 | {15,31,63,127,255,511,1023} | |
| 14-31 | | 1 | {3,7} | |
| | | 2 | {7,15} | 0th symbol |
| | | 3 | {15,31,63,127,255,511,1023} | |
| | | 4 | {15,31,63,127,255,511,1023} | |

FIG.12

Fifth example (lossless mode and lossy mode, 5 bits)

| Index | LBT type | LBT priority | CWS | PUSCH start position (the first scheduled subframe) |
|---|---|---|---|---|
| 0 | Second type LBT | - | - | The timing at which a predetermined value elapses after the 0th symbol |
| 1 | | - | - | The timing at which the predetermined value and a TA value elapse after the 0th symbol |
| 2 | | - | - | 0th symbol |
| 3-20 | Fourth type LBT | 1 | (3,7) | 1st symbol |
| | | 2 | (7,15) | |
| | | 3 | (15,31,63,127,255,511,1023) | |
| | | 4 | (15,31,63,127,255,511,1023) | |
| 21-31 | | 1 | (3,7) | 0th symbol |
| | | 2 | (7,15) | |
| | | 4 | (15,31,63,127,255,511,1023) | |

FIG.13

Sixth example (lossless mode and lossy mode, 5 bits)

| Index | LBT type | LBT priority | PUSCH start position (the first scheduled subframe) | Remaining subframes in the case where the predetermined value elapses after the 0th symbol |
|---|---|---|---|---|
| 0-7 | Second type LBT | - | The timing at which a predetermined value elapses after the 0th symbol | None, {2},{3},{4},{2,4},{2,3},{3,4},{2,3,4} |
| 8-15 | | - | The timing at which the predetermined value and a TA value elapse after the 0th symbol | None, {2},{3},{4},{2,4},{2,3},{3,4},{2,3,4} |
| 16-23 | | - | 0th symbol | None, {2},{3},{4},{2,4},{2,3},{3,4},{2,3,4} |
| 24 | Fourth type LBT | 1 | 0th symbol | None |
| 25 | | 2 | | |
| 26 | | 3 | | |
| 27 | | 4 | | |
| 28 | | 1 | 1st symbol | None |
| 29 | | 2 | | |
| 30 | | 3 | | |
| 31 | | 4 | | |

FIG.14

Seventh example (lossless mode and lossy mode, 4 bits)

| Index | LBT type | LBT priority | PUSCH start position (the first scheduled subframe) | Remaining subframes in the case where the predetermined value elapses after the 0th symbol |
|---|---|---|---|---|
| 0-2 | Second type LBT | - | The timing at which a predetermined value elapses after the 0th symbol | None,{3},{2,3,4} |
| 3-5 | | - | The timing at which the predetermined value and a TA value elapse after the 0th symbol | None,{3},{2,3,4} |
| 6-7 | | - | 0th symbol | None,{3} |
| 8 | | 1 | 0th symbol | None |
| 9 | | 2 | | |
| 10 | | 3 | | |
| 11 | Fourth type LBT | 4 | | |
| 12 | | 1 | 1st symbol | None |
| 13 | | 2 | | |
| 14 | | 3 | | |
| 15 | | 4 | | |

FIG.15

Eighth example (lossless mode and lossy mode, 6 bits)

| Index | LBT type | LBT priority | CWS | PUSCH start position (the first scheduled subframe) | Remaining subframes in the case where the predetermined value elapses after the 0th symbol |
|---|---|---|---|---|---|
| 0-7 | Second type LBT | - | - | The timing at which a predetermined value elapses after the 0th symbol | None, {2}, {3}, {4}, {2,4}, {2,3}, {3,4}, {2,3,4} |
| 8-15 | | - | - | The timing at which the predetermined value and a TA value elapse after the 0th symbol | None, {2}, {3}, {4}, {2,4}, {2,3}, {3,4}, {2,3,4} |
| 16-23 | | - | - | 0th symbol | None, {2}, {3}, {4}, {2,4}, {2,3}, {3,4}, {2,3,4} |
| 24-41 | Fourth type LBT | 1 | {3,7} | 1st symbol | None |
| | | 2 | {7,15} | | |
| | | 3 | {15,31,63,127,255,511,1023} | | |
| | | 4 | {15,31,63,127,255,511,1023} | | |
| 42-59 | | 1 | {3,7} | 0th symbol | None |
| | | 2 | {7,15} | | |
| | | 3 | {15,31,63,127,255,511,1023} | | |
| | | 4 | {15,31,63,127,255,511,1023} | | |
| 60-63 | Reserved | | | | |

FIG.16

Ninth example (lossless mode and lossy mode, 6 bits)

| Index | LBT type | LBT priority | CWS | PUSCH start position (the first scheduled subframe) | Remaining subframes in the case where the predetermined value elapses after the 0th symbol |
|---|---|---|---|---|---|
| 0-2 | Second type LBT | - | - | The timing at which a predetermined value elapses after the 0th symbol | None, {3}, {2,3,4} |
| 3-5 | | - | - | The timing at which the predetermined value and a TA value elapse after the 0th symbol | None, {3}, {2,3,4} |
| 6-8 | | - | - | 0th symbol | None, {3}, {2,3,4} |
| 9-26 | Fourth type LBT | 1 | {3,7} | 1st symbol | None |
| | | 2 | {7,15} | | |
| | | 3 | {15,31,63,127,255,511,1023} | | |
| | | 4 | {15,31,63,127,255,511,1023} | | |
| 27-44 | | 1 | {3,7} | 0th symbol | None |
| | | 2 | {7,15} | | |
| | | 3 | {15,31,63,127,255,511,1023} | | |
| | | 4 | {15,31,63,127,255,511,1023} | | |
| 45-63 | Reserved | | | | |

FIG.17

Comparison of the first to ninth examples

| Example | The indicated information | | | | | The used bit number |
|---|---|---|---|---|---|---|
| | LBT type | LBT priority | PUSCH start position | CWS | The slot in case of multi-subframe scheduling | |
| First example | ○ | ○ | ○ | | | 4 |
| Second example | ○ | ○ | ○ | | | 4 |
| Third example | ○ | ○ | ○ | ○ | | 6 |
| Fourth example | ○ | ○ | ○ | ○ | | 5 |
| Fifth example | ○ | ○ | ○ | ○ | | 5 |
| Sixth example | ○ | ○ | ○ | | ○ (Total combinations of slot) | 5 |
| Seventh example | ○ | ○ | ○ | | ○ (Part combinations of slot) | 4 |
| Eighth example | ○ | ○ | ○ | ○ | ○ (Total combinations of slot) | 6 |
| Ninth example | ○ | ○ | ○ | ○ | ○ (Part combinations of slot) | 6 |

FIG.18

METHOD FOR INDICATING AND DETERMINING LISTEN-BEFORE-TALK PARAMETERS, BASE STATION AND USER EQUIPMENT

CROSS-REFERENCE TO RELATED APPLICATIONS

This application is a 371 U.S. National Stage of International Application No. PCT/CN2017/096544, filed on Aug. 9, 2017, which claims priority to Chinese Application No. 201610659375.8, filed on Aug. 11, 2016. The entire disclosures of the above applications are incorporated herein by reference.

TECHNICAL FIELD

The present disclosure relates to a field of mobile communications, and particularly to a method for indicating a parameter value of listen-before-talk LBT parameters in a base station, a method for indicating a parameter value of listen-before-talk LBT parameters in a user equipment, as well as a base station and a user equipment.

BACKGROUND

Among the grant-free spectrum transmission technologies studied in recent years, listen-before-talk (LBT) is an important channel access mechanism. In the LBT process, the base station includes the parameter value of the LBT parameters in the downlink control information and transmits to the user equipment. The user equipment receives and detects the downlink control information, so that the LBT process is performed according to the parameter value of the LBT parameters included in the downlink control information.

The LBT parameters included in the downlink control information include various kinds of parameters like an LBT type, a Physical Uplink Shared Channel (PUSCH) start position, an LBT priority, a contention window size (CWS), and a multi-subframe scheduling gap in the case of multi-subframe scheduling, etc.

If separate bits are used to indicate the various parameters, a significant signaling overhead is required. Thus, a method, a base station, and a user equipment for indicating and determining the LBT parameters and capable of reducing the signaling overhead are desired.

SUMMARY

According to an embodiment of the present disclosure, there is provided a method for indicating a parameter value of listen-before-talk LBT parameters in a base station, comprising: determining a parameter value of LBT parameters, the LBT parameters including an LBT type, an LBT priority, and a physical uplink shared channel PUSCH start position; determining, based on a subset of a universal set formed by combinations of possible parameter values of the respective LBT parameters, an index for joint indication of the LBT parameters; generating downlink control information that includes the index; and transmitting the downlink control information to a user equipment.

In the method of the embodiment, the subset is formed by excluding conflict combinations of possible parameter values of the LBT type, the LBT priority, and the PUSCH start position, from the universal set.

In the method of the embodiment, possible parameter values of the LBT type include a second type LBT and a fourth type LBT; and as for the case where the LBT type is the second type LBT, the subset is formed without considering the LBT priority.

In the method of the embodiment, possible parameter values of the LBT type include a second type LBT and a fourth type LBT; possible parameter values of the PUSCH start position include a 0th symbol, a 1st symbol, a timing at which a predetermined value elapse after the 0th symbol, and a timing at which the predetermined value and a timing advance value elapse after the 0th symbol; and the subset is formed by excluding the combination that contains the LBT type of being the fourth type LBT and the PUSCH start position of being the timing at which the predetermined value elapses after the 0th symbol, and excluding the combination that contains the LBT type of being the fourth type LBT and the PUSCH start position of being the timing at which the predetermined value and the timing advance value elapse after the 0th symbol, from the universal set.

In the method of the embodiment, the LBT parameters further include a contention window size CWS; possible parameter values of the LBT type include a second type LBT and a fourth type LBT; and as for the case where the LBT type is the second type LBT, the subset is formed without considering the LBT priority and the CWS.

In the method of the embodiment, the subset is formed based on a usage probability of combinations of possible parameter values of the LBT type, the LBT priority, and the PUSCH start position.

In the method of the embodiment, the LBT parameters further include a multi-subframe scheduling gap, the multi-subframe scheduling gap including an LBT type of each gap; and the subset is formed based on a usage probability of combinations of possible parameter values of the LBT type, the LBT priority, the PUSCH start position, and the LBT type of each gap.

In the method of the embodiment, possible parameter values of the LBT type of each gap include a second type LBT and a fourth type LBT; the subset is formed by using the second type LBT to each gap.

In the method of the embodiment, the multi-subframe scheduling gap further includes a PUSCH start position of the remaining subframes of a plurality of subframes except a first subframe, and possible parameter values of the PUSCH start position of the remaining subframes include a 0th symbol, a 1st symbol, a timing at which a predetermined value elapses after the 0th symbol, and the timing at which the predetermined value and a timing advance value elapse after the 0th symbol; and the subset is formed by using the timing at which the predetermined value elapses after the 0th symbol to the remaining subframes.

In the method of the embodiment, possible parameter values of the LBT type include a second type LBT and a fourth type LBT; and as for the case where the LBT type is the fourth type LBT, the subset is formed by not using a gap between adjacent subframes of a plurality of subframes.

In the method of the embodiment, possible parameter values of the LBT priority include 1, 2, 3, and 4; and the subset is formed by excluding the combination that contains the LBT priority of being 3, from the universal set.

In the method of the embodiment, possible parameter values of the LBT type include a second type LBT and a fourth type LBT; possible parameter values of the PUSCH start position include a 0th symbol, a 1st symbol, a timing at which a predetermined value elapse after the 0th symbol, and a timing at which the predetermined value and a timing advance value elapse after the 0th symbol; and the subset is formed by excluding the combination that contains the LBT type of being the second type LBT and the PUSCH start position of being a 1st symbol, from the universal set.

According to another embodiment of the present disclosure, there is provided a base station for indicating a parameter value of listen-before-talk LBT parameters, the base station comprising: a parameter value determining unit configured to determine a parameter value of LBT parameters, the LBT parameters including an LBT type, an LBT priority, and a physical uplink shared channel PUSCH start position; an index determining unit configured to determine, based on a subset of a universal set formed by combinations of possible parameter values of the respective LBT parameters, an index for joint indication of the LBT parameters; a generating unit configured to generate downlink control information that includes the index; and a transmitting unit configured to send the downlink control information to a user equipment.

In the base station of the embodiment, the subset is formed by excluding conflict combinations of possible parameter values of the LBT type, the LBT priority, and the PUSCH start position, from the universal set.

In the base station of the embodiment, the subset is formed based on a usage probability of combinations of possible parameter values of the LBT type, the LBT priority, and the PUSCH start position.

In the base station of the embodiment, the LBT parameters further include a multi-subframe scheduling gap, the multi-subframe scheduling gap including an LBT type of each gap; and the subset is formed based on a usage probability of combinations of possible parameter values of the LBT type, the LBT priority, the PUSCH start position, and the LBT type of each gap.

According to still another embodiment of the present disclosure, there is provided a method for determining a parameter value of listen-before-talk LBT parameters in a user equipment, comprising: receiving downlink control information, the downlink control information including an index for joint indication of the LBT parameters, the LBT parameters including an LBT type, an LBT priority, and a physical uplink shared channel PUSCH start position; and determining a parameter value of the LBT parameters according to the index and based on a subset of a universal set formed by combinations of possible parameter values of the respective LBT parameters.

According to yet another embodiment of the present disclosure, there is provided a user equipment for determining a parameter value of listen-before-talk LBT parameters, the user equipment comprising: a receiving unit configured to receive downlink control information, the downlink control information including an index for joint indication of the LBT parameters, the LBT parameters including an LBT type, an LBT priority, and a physical uplink shared channel PUSCH start position; and a determining unit configured to determine a parameter value of the LBT parameters according to the index and based on a subset of a universal set formed by combinations of possible parameter values of the respective LBT parameters.

In the method, the base station and the user equipment for indicating and determining LBT parameters according to the embodiment of the present disclosure, signaling overhead for indicating the LBT parameters can be reduced effectively.

BRIEF DESCRIPTION OF THE DRAWINGS

The foregoing and other objects, features and advantages of the present disclosure will become more apparent from the detailed description of the embodiments of the present disclosure in conjunction with the accompanying drawings. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

FIG. 3 is a schematic diagram showing a first embodiment of a lossless mode of a method for indicating a parameter value of LBT parameters according to an embodiment of the present disclosure;

FIG. 4 is a schematic diagram showing a second embodiment of a lossless mode of a method for indicating a parameter value of LBT parameters according to an embodiment of the present disclosure;

FIG. 5 is a schematic diagram showing a first embodiment of a lossy mode of a method for indicating a parameter value of LBT parameters according to an embodiment of the present disclosure;

FIG. 6 is a schematic diagram showing a second embodiment of a lossy mode of a method for indicating a parameter value of LBT parameters according to an embodiment of the present disclosure;

FIG. 7 is a schematic diagram showing a third embodiment of a lossy mode of a method for indicating a parameter value of LBT parameters according to an embodiment of the present disclosure;

FIG. 8 is a schematic diagram showing a fourth embodiment of a lossy mode of a method for indicating a parameter value of LBT parameters according to an embodiment of the present disclosure;

FIG. 9 is a schematic diagram showing a first example of a subset formed by a method for indicating a parameter value of LBT parameters according to an embodiment of the present disclosure;

FIG. 10 is a schematic diagram showing a second example of a subset formed by a method for indicating a parameter value of LBT parameters according to an embodiment of the present disclosure;

FIG. 11 is a schematic diagram showing a third example of a subset formed by a method for indicating a parameter value of LBT parameters according to an embodiment of the present disclosure;

FIG. 12 is a schematic diagram showing a fourth example of a subset formed by a method of indicating a parameter value of LBT parameters according to an embodiment of the present disclosure;

FIG. 13 is a schematic diagram showing a fifth example of a subset formed by a method for indicating a parameter value of LBT parameters according to an embodiment of the present disclosure;

FIG. 14 is a schematic diagram showing a sixth example of a subset formed by a method for indicating a parameter value of LBT parameters according to an embodiment of the present disclosure;

FIG. 15 is a schematic diagram showing a seventh example of a subset formed by a method for indicating a parameter value of LBT parameters according to an embodiment of the present disclosure;

FIG. 16 is a schematic diagram showing an eighth example of a subset formed by a method for indicating a parameter value of LBT parameters according to an embodiment of the present disclosure;

FIG. 17 is a schematic diagram showing a ninth example of a subset formed by a method for indicating a parameter value of LBT parameters according to an embodiment of the present disclosure;

FIG. 18 is a schematic diagram showing summary and comparison of the first to ninth examples of the subset formed by a method for indicating a parameter value of LBT parameters according to an embodiment of the present disclosure;

FIG. 19 is a block diagram schematically showing main configuration of a base station according to an embodiment of the present disclosure;

FIG. 20 is a flowchart showing main steps of a method for indicating a parameter value of LBT parameters according to an embodiment of the present disclosure; and FIG. 21 is a block diagram schematically showing main configuration of a user equipment according to an embodiment of the present disclosure.

DETAILED DESCRIPTION

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Figure 1:
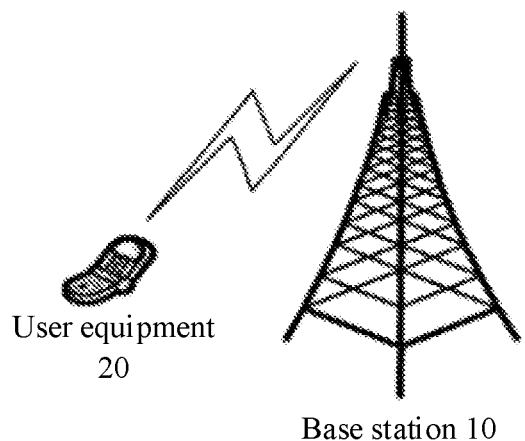
FIG. 1 is a schematic diagram of a system for applying a method for indicating and determining a parameter value of LBT parameters according to an embodiment of the present disclosure.

FIG. 1 is a schematic diagram of a system for applying a method for indicating and determining a parameter value of LBT parameters according to an embodiment of the present disclosure. As shown in FIG. 1, the system includes a base station 10 and a user equipment 20, the system can be applied to scenarios of grant-free spectrum transmission. In the system shown in FIG. 1, the base station 10 transmits downlink control information to the user equipment 20. The user equipment 20 receives and detects the downlink control information to perform the LBT process based on information related to the LBT parameters in the downlink control information.

As described above, the LBT parameters include various parameters such as an LBT type, a PUSCH start position, an LBT priority, a contention window size (CWS), a multi-subframe scheduling gap in the case of multi-subframe scheduling, and so on. If separate bits are used to indicate the respective parameters, a significant signaling overhead is required.

Accordingly, the inventor has devised a method, a base station and a user equipment for determining and indicating a parameter value of LBT parameters according to an embodiment of the present disclosure.

Hereinafter, first, a method for indicating a parameter value of LBT parameters in a base station according to an embodiment of the present disclosure will be described in detail with reference to FIG. 2.

Figure 2:
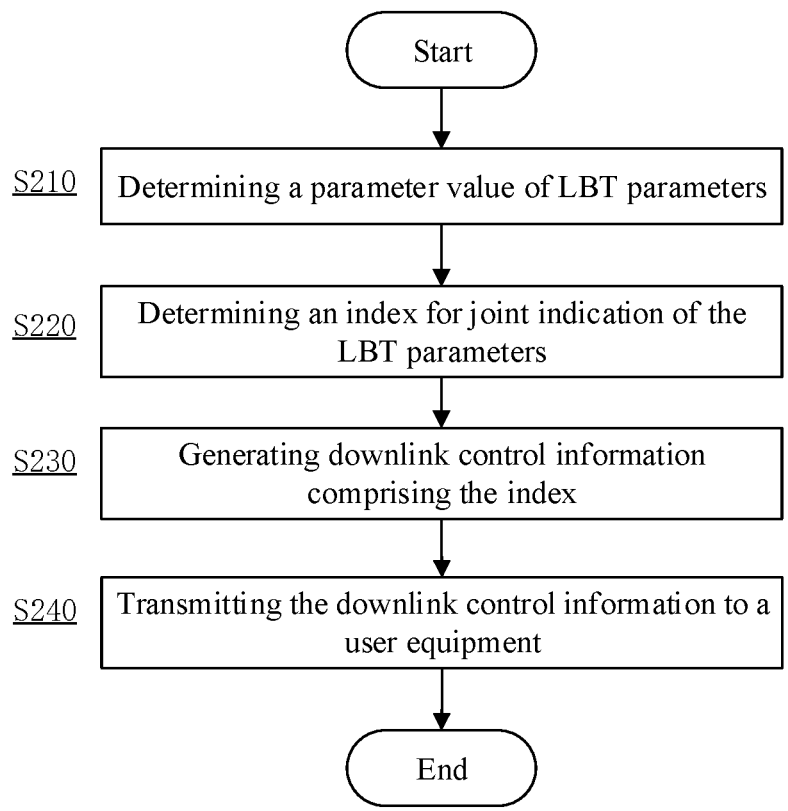
FIG. 2 is a flow chart showing main steps of a method for indicating a parameter value of LBT parameters according to an embodiment of the present disclosure.

As shown in FIG. 2, first, in step S210, a parameter value of LBT parameters is determined. In the method of the embodiment of the present disclosure, the LBT parameters include at least an LBT type, an LBT priority, and a PUSCH start position.

Specifically, possible parameter values of the LBT type include a second type LBT and a fourth type LBT. The second type of LBT refers, for example, to an LBT type based on 25 µs Listen. The fourth type LBT refers, for example, to an LBT type based on random backoff of a contention window with a variable size. Thus, if the parameter value of the LBT type is indicated separately, at least 1 (one) separate bit is required.

The LBT priority can be used for multiplexing of transport services. Possible parameter values of the LBT priority include 1, 2, 3, and 4. Thus, if the parameter value of the LBT priority is indicated separately, at least 2 separate bits are required.

The PUSCH start position is used to indicate a timing at which the UE starts PUSCH transmission after a successful LBT. More specifically, the PUSCH start position can indicate a starting PUSCH DFT-S-OFDM symbol. Possible parameter values of the PUSCH start position include a 0th symbol, a timing at which a predetermined value elapses after the 0th symbol, a timing at which the predetermined value and a timing advance (TA) value elapse after the 0th symbol, and a 1st symbol. The predetermined value is, for example, 25 µs or the like. Thus, if the parameter value of the PUSCH start position is indicated separately, at least 2 separate bits are required.

Next, in step S220, an index for joint indication of the LBT parameters is determined based on a subset of a universal set formed by combinations of possible parameter values of the respective LBT parameters. Thereafter, in step S230, downlink control information that includes the index is generated. And, in step S240, the downlink control information is sent to the user equipment.

That is to say, in the method according to the embodiment of the present disclosure, the LBT parameters are not separately indicated as mentioned above, instead, a predetermined subset is selected in advance from the universal set formed by combinations of possible parameter values of the respective LBT parameters, the corresponding index is obtained from the subset according to the parameter value of the respective LBT parameters, and the index is indicated.

Specifically, in a first implementation, the subset is formed by excluding conflict combinations of possible parameter values of the LBT type, the LBT priority, and the PUSCH start position, from the universal set. Herein, the expression "conflict combination" means the combination in which application scenarios of the parameter values of the respective LBT parameters are contradictory. In other words, the combination is unreasonable. Thus, the subset formed by excluding the conflict combinations from the universal set does not affect the actual performance indicated by the LBT parameters. Thus, this mode is also called a lossless mode.

In a second implementation, the subset is formed based on a usage probability of combinations of possible parameter values of the respective LBT parameters. Herein, the expression "probability of use" means the possibility that the combination exists in the actual application scenarios. The combinations that are common in the actual application scenarios have a high probability of use, while the combinations that are not common in the actual application scenarios have a low probability of use. Thus, the subset formed by excluding uncommon combinations from the universal set can satisfy the requirements of indication of common LBT parameters, but cannot meet the requirements in the case of indication of uncommon LBT parameters. That is, the subset has a slight impact on the flexibility of indication of the LBT parameters. This is a compromise between reduction in signaling overhead and decrease in flexibility of the indication. Thus, this mode is also called lossy mode.

In the following, the processing in the lossless mode and the lossy mode will be described respectively.

First, the processing in the lossless mode will be described. That is, the subset is formed by excluding conflict combinations of possible parameter values of the LBT type, the LBT priority, and the PUSCH start position, from the universal set.

In a first embodiment, the relationship between the LBT priority and the LBT type is considered. Specifically, since the LBT priority is needed only in the case of the fourth type LBT, combinations of the values including the second type LBT and any value of the LBT priority is unnecessary. Thus, as for the case where the LBT type is the second type LBT, the subset is formed without considering the LBT priority.

In a second embodiment, relationship between the LBT type and the PUSCH start position is considered. Specifically, not all PUSCH starting positions are applicable to respective LBT types. More specifically, the timing at which the predetermined value elapses after the 0th symbol and the timing at which the predetermined value and the timing advance value elapse after the 0th symbol are not applicable to the fourth type LBT. Thus, the combinations that contain the fourth type LBT and the timing at which the predetermined value elapse after the 0th symbol, or the combinations that contain the fourth type LBT and the timing at which the predetermined value and the timing advance value elapse after the 0th symbol are unnecessary. Thereby, the subset is formed by excluding the combination that contains the LBT type of being the fourth type LBT and the PUSCH start position of being the timing at which the predetermined value elapses after the 0th symbol, and excluding the combination that contains the LBT type of being the fourth type LBT and the PUSCH start position of being the timing at which the predetermined value and the timing advance value elapse after the 0th symbol, from the universal set.

In a third embodiment, the LBT parameters also include the CWS as described above. The CWS is used to indicate a size of the window in which the UE generates a random backoff counter, and its possible parameter values include {3, 7, 15, 31, 63, 127, 255, 511, 1023}. That is, if the CWS is indicated separately, at least 4 separate bits are required. In this embodiment, relationship between the CWS and the LBT type is considered. In particular, the CWS is only applicable to the fourth type LBT. Thus, the combination that contains the second type LBT and the CWS is unnecessary. As for the case where the LBT type is the second type LBT, the subset is formed without considering the CWS. Further, since the parameter value of the CWS is associated with the parameter value of the LBT priority in the current protocol, as for the case where the LBT type is the second type LBT, the subset is formed without considering the LBT priority and the CWS.

It should be noted that the subset described above may be pre-stored in the user equipment and the base station in various forms such as a table. For example, it may be placed in the user equipment and the base station in a manner like hard coding. Alternatively, the subset may also be communicated between the user equipment and the base station in a manner such as higher layer signaling during operation. Thus, there is no ambiguity in understanding between the user equipment and the base station.

In addition, it should be noted that the lossless indication mode described above is merely exemplary. Those skilled in the art can design the subset in consideration of other relationships between the various LBT parameters based on the teaching of the present disclosure.

Further, it should be noted that the various examples described above may be used not only individually, but also in appropriate combinations or the like. FIGS. 3 and 4 exemplarily show the case where the respective examples described above are used in combination.

FIG. 3 shows a first application example of a method for indicating a parameter value of LBT parameters according to an embodiment of the present disclosure. In FIG. 3, the first embodiment and the second embodiment as described above are considered in combination. As can be seen from FIG. 3, since the LBT priority is not considered for the second type LBT, and only the case where the PUSCH start position is the 0th symbol and the 1st symbol is considered for the fourth type LBT, then only a maximum of 16 situations need to be indicated (indexes 12-15 therein are reserved). Thus, the required bit is 4 bits. The signaling overhead is reduced by 1 bit compared to the case where the LBT type (1 bit), the LBT priority (2 bits), and the PUSCH start position (2 bits) are separately indicated.

FIG. 4 shows a second application example of a method for indicating a parameter value of LBT parameters according to an embodiment of the present disclosure. In FIG. 4, the first embodiment, the second embodiment, and the third embodiment as described above are considered in combination. As can be seen from FIG. 4, since the LBT priority is not considered for the second type LBT, only the case where the PUSCH start position is the 0th symbol and the 1st symbol is considered for the fourth type LBT, and the LBT priority and the associated CWS are not considered for the case where the LBT type is the second type LBT, then it only needs to indicate a maximum of 64 situations (the indexes 40-63 therein are reserved). Thus, the required bit is 6 bits. The signaling overhead is reduced by 3 bits as compared with the case where the LBT type (1 bit), the LBT priority (2 bits), the CWS (4 bits), and the PUSCH start position (2 bits) are independently indicated.

In the above, the processing in the lossless mode of the first implementation has been described. Next, the processing in the lossy mode in a second implementation will be described. In the second implementation, the subset is formed based on a usage probability of combinations of possible parameter values of the respective LBT parameters. More specifically, the second embodiment may be applied to the case of multi-subframe scheduling, and may also be applied to the case of single subframe scheduling.

In the case of multi-subframe scheduling, the LBT type as described above may be an LBT type of a first subframe of a plurality of subframes, and the LBT priority as described above may be an LBT priority of the first subframe, the PUSCH start position as described above may be a PUSCH start position of the first subframe.

In addition, in the case of multi-subframe scheduling, the LBT parameters further include a multi-subframe scheduling gap. The multi-subframe scheduling gap may include an LBT type of each gap, or referred to as an LBT type of remaining subframes other than the first subframe among a plurality of scheduled subframes. Possible parameter values of the LBT type of each gap include the second type LBT and the fourth type LBT as described above. The multi-subframe scheduling gap may also include a PUSCH start position of the remaining subframes. Possible parameter values of the PUSCH start position of the remaining subframe include a 0th symbol, a 1st symbol, a timing at which a predetermined value elapses after the 0th symbol, and the timing at which the predetermined value elapses after the 0th symbol, and the timing at which the predetermined value and a timing advance value elapse after the 0th symbol. Moreover, those skilled in the art can understand that, according to design requirements, the multi-subframe scheduling gap may further include information on the gap is located at a start position of which subframes, an LBT priority of the remaining subframes, a CWS of the remaining subframes, and the like.

In this second implementation, the subset may be formed based on a usage probability of combinations of possible parameter values of the LBT type, the LBT priority, and the PUSCH start position.

Further, in the case of multi-subframe scheduling, the subset may be formed based on a usage probability of combinations of possible parameter values of the LBT type, the LBT priority, the PUSCH start position, and the LBT type of each gap.

More specifically, in a first embodiment, on the one hand, considering that in the case of multi-subframe scheduling, whether within the maximum channel occupancy time (MCOT) or outside the MCOT, the gaps between the respective subframes are all used to enable multi-user multiplexing. On the other hand, considering that the backoff counter used in the fourth type LBT is asynchronous between a plurality of scheduled user equipment, and interference conditions between the plurality of user equipment are different, using the fourth type LBT for multi-user multiplexing is not efficient. Thus, in the first embodiment, a first limitation is exerted, that is, in the case of multi-subframe scheduling, if there is a gap, each gap uses the second type LBT. That is, the subset is formed by using the second type LBT to each gap.

In addition, in further consideration of the case where the previous subframe is an uplink subframe and the LBT type of the current subframe (or the LBT type of the gap between the current subframe and the previous subframe) is the second type LBT, the PUSCH start position of the current subframe should be the timing at which a predetermined value elapses after the 0th symbol. Thus, the first limitation also means that for the remaining subframes other than the first subframe, the PUSCH start position uses the timing at which a predetermined value elapses after the 0th symbol. That is, the subset is formed by using the timing at which a predetermined value elapses after the 0th symbol to the remaining subframes.

FIG. 5 is a schematic diagram showing a first embodiment of a lossy mode of a method for indicating a parameter value of LBT parameters according to an embodiment of the present disclosure. In FIG. 5, illustration is made with the multi-subframe scheduling case including a total of four subframes (that is, the remaining subframes are the second, third, and fourth subframes) as an example. In this case, if the second type LBT or the fourth type LBT can be used for each gap, a total of 4×4=16 bits is required. In contrast, as can be seen from FIG. 5, since each gap only uses the second type LBT, only a maximum of 128 situations needs to be indicated (the indexes 96-127 therein are reserved). Thus, the required bit is 7 bits. Accordingly, although the flexibility to indicate LBT parameters is slightly reduced, the signaling overhead is significantly reduced.

In a second embodiment, on the one hand, within the MCOT, typically, in order to obtain the channel more efficiently, as for each new uplink transmission (i.e., for the first subframe in the case of multi-subframe scheduling), the second type LBT is used. Thus, it can be asserted that the fourth type LBT is less used for the first subframe of the multi-subframe scheduling case within the MCOT, instead the second type LBT is used. On the other hand, outside the MCOT, as a new uplink transmission initiated by other user equipment (i.e., as for the first subframe in the case of multi-subframe scheduling), the fourth type LBT is used to achieve multi-user multiplexing. In this case, even if the second type LBT is used between the remaining subframes of the user equipment, it is difficult to implement multiplexing between said user equipment and other user equipment, so that the second type LBT of the remaining subframes is basically unnecessary. Thus, in the second embodiment, a second limitation is exerted, that is, in the case of multi-subframe scheduling, if the first subframe uses the fourth type LBT, there is no gap between the remaining subframes. In other words, as for the case where the LBT type is the fourth type LBT, the subset is formed by not using a gap between adjacent subframes of a plurality of subframes.

FIG. 6 is a schematic diagram showing a second embodiment of a lossy mode of a method for indicating a parameter value of LBT parameters according to an embodiment of the present disclosure. In FIG. 6, similarly, illustration is made with the multi-subframe scheduling case where a total of four subframes are included as an example. In FIG. 6, since no gap is used between the remaining subframes in the case where the fourth type LBT is used for the first subframe, only a maximum of 64 cases (indexes 40-63 therein are reserved) needs to be indicated. Thus, the required bits are 5 bits. Compared with FIG. 5, 2 bits are further reduced. Accordingly, although the flexibility to indicate LBT parameters is slightly reduced, the signaling overhead is significantly reduced.

In a third embodiment, in consideration of that the CWS associated with the LBT priority 3 and the CWS associated with the LBT priority 4 both are {15, 31, 63, 127, 255, 511, 1023}, in order to reduce the signaling overhead, in this embodiment, a third limitation is exerted, one of the LBT priority 3 and the LBT priority 4 is removed, for example, the LBT priority level 3 is removed. That is, the subset is formed by excluding combination that contains the LBT priority of being 3 (and its associated CWS), from the universal set.

FIG. 7 is a schematic diagram showing a third embodiment of a lossy mode of a method for indicating a parameter value of LBT parameters according to an embodiment of the present disclosure. In FIG. 7, since the combination that contains the LBT priority of being 3 is excluded, it only needs to indicate a maximum of 31 cases (indexes 26-31 therein are reserved). Thus, the required bits are 5 bits, the signaling overhead is significantly reduced.

In the fourth embodiment, in consideration of that the case of the PUSCH start position being the 1st symbol is mainly applied to the LBT type 4, thus, in order to reduce the signaling overhead, in this embodiment, a fourth limitation is exerted, that is, the combination that contains the LBT type of being the second type LBT and the PUSCH start position of being a 1st symbol is excluded. That is, the subset is formed by excluding combination that contains the LBT type of being the second type LBT and the PUSCH start position of being a 1st symbol, from the universal set.

FIG. 8 is a schematic diagram showing a fourth embodiment of a lossy mode of a method for indicating a parameter value of LBT parameters according to an embodiment of the present disclosure. In FIG. 8, since the combination that contains the LBT type of being the second type LBT and the PUSCH start position of being the 1st symbol is excluded, only a maximum of 31 cases need to be indicated. Thus, the required bits are 5 bits, the signaling overhead is significantly reduced.

It should be noted that the embodiment shown in FIG. 8 is a case where the fourth limitation is applied in the case of multi-subframe scheduling. However, those skilled in the art can understand that the fourth limitation is not limited thereto, but can be applied to the case of single subframe scheduling. That is, a new table can be formed by removing the rightmost column in FIG. 8 and re-indexing the order.

In addition, it should be noted that in the tables of FIGS. 5-8, the case of multi-subframe scheduling is illustrated by taking a total of 4 subframes as an example. However, the method of the embodiment of the present disclosure is not limited thereto, but may be applied to a case of scheduling more or fewer subframes.

Moreover, it should be noted that FIGS. 3-8 only show some exemplary subsets used in the method of indicating a parameter value of LBT parameters according to an embodiment of the present disclosure. Those skilled in the art can design other various subsets on this basis.

In addition, it should be noted that FIGS. 3 to 8 may possibly not separately apply only one of the first to third examples of the lossless mode as described above, or the first to fourth examples of the lossy mod as described above e, instead it is possible to apply a combination of one or more of the examples. For example, FIG. 8 applies both the second limitation and the fourth limitation in the lossy mode. Moreover, various combinations, sub-combinations, modifications, and substitutions can be made in respect of the various subsets of the lossless or lossy modes illustrated in FIGS. 3-8.

Next, some examples of subsets formed based on the lossy mode and the lossless mode will be described with reference to FIGS. 9 to 17.

FIG. 9 shows a first example of a subset formed by the lossless mode. Specifically, the subset is formed by not considering the LBT priority for the second type LBT, and considering only the PUSCH start position of being the 0th symbol and the 1st symbol a for the fourth type LBT, which is the same as that shown in FIG. 3, no details will be repeated herein.

FIG. 10 shows a second example of a lossy indication mode obtained by combining the lossless indication mode and the lossy indication mode. Specifically, the subset is formed by not considering the LBT priority for the second type LBT, considering only the PUSCH start position of being the 0th symbol and the 1st symbol for the fourth type LBT, excluding the combination that contains the LBT priority of being 3 from the universal set and excluding the combination that contains the LBT type of being the second type LBT and the PUSCH start position of being the 1st symbol from the universal set.

FIG. 11 shows a third example as a lossless indication mode. Specifically, the subset is formed by not considering the LBT priority and the CWS for the second type LBT, considering only the PUSCH start position of being the 0th symbol and the 1st symbol for the fourth type LBT, which is the same as that shown in FIG. 4, no details will be repeated herein.

FIG. 12 shows a fourth example of a lossy indication mode obtained by combining the lossless indication mode and the lossy indication mode. Specifically, the subset is formed not considering the LBT priority for the second type LBT, considering only the PUSCH start position of being the 0th symbol and the 1st symbol for the fourth type LBT, excluding the combination that contains the LBT priority of being 3 and the CWS, and excluding the combination that contains the LBT type of being the second type LBT and the PUSCH starting position of being the 1st symbol, from the universal set. It is to be noted that in FIG. 12, only some but not all of the combinations that contains the LBT priority of being 3 are excluded, thereby enabling respective LBT parameters to be indicated by exactly 5 bits.

FIG. 13 shows a fifth example of the lossy indication mode obtained by combining the lossless indication mode and the lossy indication mode. Specifically, the subset is formed by not considering the LBT priority for the second type LBT, considering only the PUSCH start position of being the 0th symbol and the 1st symbol for the fourth type LBT, excluding the combination that contains the LBT priority of being 3 and the CWS from the universal set, and excluding the combination that contains the LBT type of being the second type LBT and the PUSCH starting position of being the 1st symbol from the universal set. It is to be noted that in FIG. 13, only some but not all of the combinations of the priority of being 3 are excluded, thereby enabling respective LBT parameters to be indicated by exactly 5 bits.

FIG. 14 shows a sixth example of a lossy indication mode obtained by combining the lossless indication mode and the lossy indication mode. Specifically, the subset is formed by not considering the LBT priority for the second type LBT, considering only the PUSCH start position of being the 0th symbol and the 1st symbol for the fourth type LBT, excluding the combination that contains the LBT type of being the second type LBT and the PUSCH start position of being the 1st symbol, and using the second type LBT to each gap in the case where the first subframe uses the second type LBT, and exerting no gap between the remaining subframes in the case where the first subframe uses the fourth type LBT, which is the same as that shown in FIG. 8, no details will be repeated herein.

FIG. 15 shows a seventh example of a lossy indication mode obtained by combining the lossless indication mode and the lossy indication mode. Specifically, the subset is formed by not considering the LBT priority for the second type LBT, considering only the PUSCH start position of being the 0th symbol and the 1st symbol for the fourth type LBT, excluding the combination that contains the LBT type of being the second type LBT and the PUSCH start position being the 1st symbol, using the second type LBT to each gap in the case where the first subframe uses the second type LBT, and using no gap to the remaining subframes in the case where the first subframe uses the fourth LBT, and through gap configuration {none, all, only in 1st subframe, in 1st subframe and 3rd subframe} in the case of multi-subframe scheduling.

FIG. 16 shows an eighth example of a lossy indication mode obtained by combining the lossless indication mode and the lossy indication mode. Specifically, the subset is formed by not considering the LBT priority and its CWS for the second type LBT, considering only the PUSCH start position of being the 0th symbol and the 1st symbol for the fourth type LBT, excluding the combination that includes the LBT type of being the second type LBT and the PUSCH start position of being the 1st symbol, and using the second type LBT to each gap in the case where the first subframe uses the second type LBT, exerting no gap between the remaining subframes in the case where the first subframe uses the fourth type LBT.

FIG. 17 shows a ninth example of the lossy indication mode obtained by combining the lossless indication mode and the lossy indication mode. Specifically, by not considering the LBT priority and its CWS for the second type LBT, considering only the PUSCH start position of being the 0th symbol and the 1st symbol for the fourth type LBT, excluding the combination that contains the LBT type of being the second type LBT and the PUSCH start position being the 1st symbol, using the second type LBT to each gap in the case where the first subframe uses the second type LBT, and using no gap to the remaining subframes in the case where the first subframe uses the fourth LBT, and through gap configuration {none, all, only in 1st subframe, in 1st subframe and 3rd subframe} in the case of multi-subframe scheduling.

FIG. 18 is a schematic diagram showing summary and comparison of the first to ninth examples of a subset formed by a method of indicating LBT parameters according to an embodiment of the present disclosure.

It is to be noted that those described with reference to FIGS. 9-18 only are some of the examples of the method of indicating LBT parameters according to embodiment of the present disclosure. The method for indicating the LBT parameters of the embodiment of the present disclosure is not limited thereto. Based on the teaching of the method according to the embodiment of the present disclosure, those skilled in the art can form a other subsets by appropriately selecting a portion from the universal set formed by all combinations of possible parameter values of the LBT parameters.

Hereinafter, a base station according to an embodiment of the present disclosure will be described with reference to FIG. 19, the base station can perform the above-described method of indicating a parameter value of LBT parameters described with reference to FIG. 2, As shown in FIG. 19, the base station 1900 comprises a parameter value determining unit 1910, an index determining unit 1920, a generating unit 1930, and a transmitting unit 1940. It should be noted that FIG. 19 shows only elements closely related to the embodiment of the present disclosure in the base station 1900, and this is merely illustrative, and the base station 1900 may comprise other elements as needed.

The parameter value determining unit 1910 is configured to determine a parameter value of LBT parameters, the LBT parameters including an LBT type, an LBT priority, and a physical uplink shared channel PUSCH start position.

The index determining unit 1920 is configured to determine, based on a subset of a universal set formed by combinations of possible parameter values of the respective LBT parameters, an index for joint indication of the LBT parameters.

The generating unit 1930 is configured to generate downlink control information that includes the index.

The transmitting unit 1940 is configured to send the downlink control information to a user equipment.

In an embodiment, the subset is formed by excluding conflict combinations of possible parameter values of the LBT type, the LBT priority, and the PUSCH start position, from the universal set.

In another embodiment, the subset is formed based on a usage probability of combinations of possible parameter values of the LBT type, the LBT priority, and the PUSCH start position.

In another embodiment, the LBT parameters further include a multi-subframe scheduling gap, the multi-subframe scheduling gap including an LBT type of each gap; and the subset is formed based on a usage probability of combinations of possible parameter values of the LBT type, the LBT priority, the PUSCH start position, and the LBT type of each gap.

The configuration and operation of the various units of the base station 1900 have been described in detail in the method described with reference to FIGS. 2-18, and details will not be repeated herein.

Next, a method for determining a parameter value of LBT parameters in a user equipment will be described with reference to FIG. 20.

FIG. 20 is a flow chart showing main steps of a method for determining a parameter value of LBT parameters in a user equipment according to an embodiment of the disclosure.

As shown in FIG. 20, first, in step S2010, downlink control information is received. Specifically, the downlink control information includes an index for joint indication of the LBT parameter, the LBT parameter including an LBT type, an LBT priority, and a physical uplink shared channel PUSCH start position.

Next, in step S2020, a parameter value of the LBT parameter is determined according to the index and based on a subset of a universal set formed by combinations of possible parameter values of the respective LBT parameters Specifically, as described above with reference to FIGS. 2-19, the index is an index for the subset, it may be a lossless indication for the LBT parameter, or may be a lossy indication for the LBT parameter. The subset described above may be pre-stored in the user equipment and the base station in various forms such as a table. For example, it may be placed in the user equipment and the base station in a manner such as hard coding. Alternatively, the subset may also be communicated between the user equipment and the base station in a manner such as higher layer signaling during operation. Thus, there is no ambiguity in understanding between the user equipment and the base station.

Thus, in step S2020, the user equipment can determine the parameter value of the corresponding LBT parameter from for example a subset in the form of a table by means such as looking up in the table based on the index. The forming of the subset has been described in detail above with reference to FIGS. 2-19, no details will be repeated herein.

Hereinafter, a user equipment according to an embodiment of the present disclosure will be described with reference to FIG. 21, the user equipment can perform the method for determining a parameter value of LBT parameters as already described with reference to FIG. 20.

As shown in FIG. 21, the user equipment 2100 includes a receiving unit 2110 and a determining unit 2120. It should be noted that FIG. 21 only shows the elements closely related to the embodiment of the present disclosure in the user equipment 2100, and this is merely illustrative, and the user equipment 2100 may include other elements as needed.

The receiving unit 2110 is configured to receive downlink control information, the downlink control information that includes an index for joint indication of the LBT parameter, the LBT parameter including an LBT type, an LBT priority, and a physical uplink shared channel PUSCH start position.

The determining unit 2120 is configured to determine the parameter value of the LBT parameter according to the index and based on a subset of a universal set formed by combinations of possible parameter values of the respective LBT parameters.

Configuration and operation of the various units of the user equipment 2100 have been described in detail in the method described with reference to FIG. 20, no details will be repeated herein.

In the method, the base station and the user equipment for indicating and determining LBT parameters according to the embodiment of the present disclosure, because a portion is selected from a universal set of combinations of possible parameter values of the LBT parameters to form the subset in advance, and the parameter value is indicated based on the subset, signaling overhead for indicating the LBT parameters can be reduced effectively.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

In addition, in this specification, the expressions like "first", "second", etc. are used for convenience of description only, and do not mean that the defined unit must be implemented as a plurality of separate units, It does not mean that there are prioritized steps in the defined steps, and so on Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and disclosures. To sum up, contents of this specification should not be construed as limiting the present disclosure.

The invention claimed is:

1. A base station for indicating a parameter value of listen-before-talk LBT parameters, the base station comprising:
   a processor;
   a storage medium having computer program instructions stored thereon, wherein the computer program instructions, when executed by the processor, perform processing of:
   determining a parameter value of LBT parameters, the LBT parameters including an LBT type, an LBT priority, and a physical uplink shared channel PUSCH start position;
   determining, based on a subset of a universal set formed by combinations of possible parameter values of the respective LBT parameters, an index for joint indication of the LBT parameters, wherein the subset is formed based on a usage probability of combinations of possible parameter values of the LBT type, the LBT priority, and the PUSCH start position;
   generating downlink control information that includes the index; and
   sending the downlink control information to a user equipment.

2. The base station according to claim 1, wherein
   the LBT type is an LBT type of a first subframe of a plurality of subframes;
   the LBT parameters further include a multi-subframe scheduling gap, the multi-subframe scheduling gap including LBT types of remaining subframes other than the first subframe among the plurality of subframes; and
   the subset is formed based on a usage probability of combinations of possible parameter values of the LBT type of the first subframe, the LBT priority, the PUSCH start position, and the LBT types of the remaining subframes.

3. A method for determining a parameter value of listen-before-talk LBT parameters in a user equipment, comprising:
   receiving downlink control information, the downlink control information including an index for joint indication of the LBT parameters, the LBT parameters including an LBT type, an LBT priority, and a physical uplink shared channel PUSCH start position; and
   determining a parameter value of the LBT parameters according to the index and based on a subset of a universal set formed by combinations of possible parameter values of the respective LBT parameters, wherein the subset is formed based on a usage probability of combinations of possible parameter values of the LBT type, the LBT priority, and the PUSCH start position.

4. A user equipment for determining a parameter value of Listen-Before-Talk LBT parameters, the user equipment comprising:
   a processor;
   a storage medium having computer program instructions stored thereon, wherein the computer program instructions, when executed by the processor, perform processing of:
   receiving downlink control information, the downlink control information including an index for joint indication of the LBT parameters, the LBT parameters including an LBT type, an LBT priority, and a physical uplink shared channel PUSCH start position; and
   determining a parameter value of the LBT parameters according to the index and based on a subset of a universal set formed by combinations of possible parameter values of the respective LBT parameters, wherein the subset is formed based on a usage probability of combinations of possible parameter values of the LBT type, the LBT priority, and the PUSCH start position.

5. The user equipment of claim 4, wherein
the LBT type is an LBT type of a first subframe of a plurality of subframes;
the LBT parameters further include a multi-subframe scheduling gap, the multi-subframe scheduling gap including LBT types of remaining subframes other than the first subframe among the plurality of subframes; and
the subset is formed based on a usage probability of combinations of possible parameter values of the LBT type of the first subframe, the LBT priority, the PUSCH start position, and the LBT types of the remaining subframes.

6. The user equipment of claim 5, wherein
possible parameter values of the LBT types of the remaining subframes include a second type LBT and a fourth type LBT;
the subset is formed by using the second type LBT to the remaining subframes.

7. The user equipment of claim 6, wherein
the multi-subframe scheduling gap further includes PUSCH start positions of the remaining subframes, and possible parameter values of the PUSCH start positions of the remaining subframes include a 0th symbol, a 1st symbol, a timing at which a predetermined value elapses after the 0th symbol, and a timing at which the predetermined value and a timing advance value elapse after the 0th symbol; and
the subset is formed by using the timing at which the predetermined value elapses after the 0th symbol to the remaining subframes.

8. The user equipment of claim 5, wherein
possible parameter values of the LBT type include a second type LBT and a fourth type LBT; and
as for the case where the LBT type is the fourth type LBT, the subset is formed by not using a gap between adjacent subframes of a plurality of subframes.

9. The user equipment of claim 4, wherein
possible parameter values of the LBT priority include 1, 2, 3, and 4; and
the subset is formed by excluding a combination that contains the LBT priority of being 3, from the universal set.

10. The user equipment of claim 4, wherein
possible parameter values of the LBT type include a second type LBT and a fourth type LBT;
possible parameter values of the PUSCH start position include a 0th symbol, a 1st symbol, a timing at which a predetermined value elapse after the 0th symbol, and a timing at which the predetermined value and a timing advance value elapse after the 0th symbol; and
the subset is formed by excluding a combination that contains the LBT type of being the second type LBT and the PUSCH start position of being a 1st symbol, from the universal set.

* * * * *